United States Patent
Ono et al.

(10) Patent No.: US 10,446,804 B2
(45) Date of Patent: Oct. 15, 2019

(54) HERMETICALLY SEALED BATTERY AND MANUFACTURING METHOD FOR HERMETICALLY SEALED BATTERY

(71) Applicant: TOYOTA JIDOSHA KABUSHIKI KAISHA, Toyota-shi, Aichi-ken (JP)

(72) Inventors: Tomohiro Ono, Miyoshi (JP); Yuta Nemoto, Toyota (JP); Kazuyuki Kusama, Nagoya (JP); Rika Shimazaki, Okazaki (JP); Toshinori Okura, Toyota (JP); Naoto Kagami, Toyota (JP); Youichi Naruse, Nagoya (JP); Masao Takano, Okazaki (JP); Kaito Matsubara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 170 days.

(21) Appl. No.: 15/685,700

(22) Filed: Aug. 24, 2017

(65) Prior Publication Data
US 2018/0069200 A1     Mar. 8, 2018

(30) Foreign Application Priority Data
Sep. 8, 2016    (JP) ................................ 2016-175940

(51) Int. Cl.
| | |
|---|---|
| *H01M 2/00* | (2006.01) |
| *H01M 2/02* | (2006.01) |
| *H01M 2/04* | (2006.01) |
| *H01M 2/06* | (2006.01) |
| *H01M 2/30* | (2006.01) |

(52) U.S. Cl.
CPC ......... *H01M 2/022* (2013.01); *H01M 2/0434* (2013.01); *H01M 2/06* (2013.01); *H01M 2/30* (2013.01)

(58) Field of Classification Search
CPC .......... H01M 2/022; H01M 2/30; H01M 2/06; H01M 2/0434
See application file for complete search history.

(56) References Cited

U.S. PATENT DOCUMENTS

2012/0288748 A1\* 11/2012 Oshima ............... H01M 2/0426
                                                                    429/179
2013/0196221 A1\* 8/2013 Hattori ................ H01M 2/0217
                                                                    429/179

FOREIGN PATENT DOCUMENTS

| JP | 2009-37817 A | 2/2009 |
|---|---|---|
| JP | 2009-87729 A | 4/2009 |

(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

A region of a hole-inner circumferential surface composing a portion defining a terminal through-hole, the region being located on the battery case cover side, include a tapered surface gradually enlarged in diameter as extending toward the battery case cover side and opening toward the battery case cover side; when riveting is carried out, a region of a shaft portion, the region being located inward of the tapered surface, is enlarged in diameter so as to form an annular projecting portion in contact with the tapered surface; and a hole circumferential portion located around the portion defining the terminal through-hole is held between the external enlarged-diameter portion and the annular projecting portion so as to fix a first terminal member to a second terminal member.

6 Claims, 11 Drawing Sheets

(56) References Cited

FOREIGN PATENT DOCUMENTS

| | | | |
|---|---|---|---|
| JP | 2009-259524 | A | 11/2009 |
| JP | 2011-159450 | A | 8/2011 |
| JP | 2017-84575 | A | 5/2017 |

* cited by examiner

HERMETICALLY SEALED BATTERY AND MANUFACTURING METHOD FOR HERMETICALLY SEALED BATTERY

INCORPORATION BY REFERENCE

The disclosure of Japanese Patent Application No. 2016-175940 filed on Sep. 8, 2016 including the specification, drawings and abstract is incorporated herein by reference in its entirety.

BACKGROUND

1. Technical Field

The present disclosure relates to a hermetically sealed battery and a manufacturing method for a hermetically sealed battery.

2. Description of Related Art

Japanese Patent Application Publication No. 2009-259524 discloses a hermetically sealed battery and a manufacturing method for the hermetically sealed battery, and the hermetically sealed battery includes: a box-shaped battery case body having an opening; an electrode body accommodated in an inside of the battery case body; a battery case cover that has cover through-holes and covers the opening of the battery case body; metallic first terminal members having terminal through-holes; and metallic second terminal members including shaft portions inserted through the cover through-holes and the terminal through-holes, and base seat portions located at rear ends of the shaft portions. The shaft portion of each second terminal member includes a cylindrical portion having an opening at a front end thereof.

The manufacturing method of JP 2009-259524 A includes a disposition step of inserting the shaft portion of each second terminal member from the front end thereof through the cover through-hole of the battery case cover and the terminal through-hole of the first terminal member in this order so as to dispose the battery case cover between the base seat portion of each second terminal member and each first terminal member. In addition, the method further includes a riveting step of plastically deforming the shaft portion of each second terminal member. In this riveting step, a region of the cylindrical portion of each second terminal member, the region projecting from an external terminal toward the front end side thereof is pressed and enlarged in a direction from an inner circumferential surface toward an outer circumferential surface of the cylindrical portion so as to deform this region into an external enlarged-diameter portion in an annularly tabular shape, to thereby hold and fix the battery case cover and the first terminal member between the base seat portion and the external enlarged-diameter portion.

SUMMARY

Meanwhile, in the manufacturing method of JP 2009-259524 A, after the riveting step, in order to firmly connect (join) each first terminal member to each corresponding second terminal member, there is provided a welding step to weld the external enlarged-diameter portion of the second terminal member to the first terminal member. Unfortunately, when the external enlarged-diameter portion of the second terminal member is welded to the first terminal member, a spatter splashes, and this spatter might adhere to the battery case cover and others. Consequently, the spatter adhering to the battery case cover and others might be mixed into the inside of the battery case. In addition, the welding step is carried out in addition to the riveting step, which results in increase in manufacturing cost. For this reason, there has been desired a manufacturing method capable of firmly connecting the first terminal members to the second terminal members without welding the first terminal members to the second terminal members.

The present disclosure provides a manufacturing method for a hermetically sealed battery capable of firmly connecting first terminal members to second terminal members, and also provides a hermetically sealed battery in which the first terminal members and the second terminal members are firmly connected to each other.

A first aspect of the present disclosure is a manufacturing method for a hermetically sealed battery, the hermetically sealed battery including: a battery case body in a box-shape having an opening; an electrode body accommodated in the battery case body; a battery case cover having a portion defining a cover through-hole, the battery case cover covering the opening of the battery case body; a metallic first terminal member having a portion defining a terminal through-hole; and a metallic second terminal member that includes a solid cylindrical shaft portion inserted through the portion defining the cover through-hole and the portion defining the terminal through-hole, and a base seat portion located on rear end side of the shaft portion, and the manufacturing method for the hermetically sealed battery includes: inserting the shaft portion of the second terminal member from front end side of the shaft portion through the portion defining the cover through-hole of the battery case cover and the portion defining the terminal through-hole of the first terminal member in this order so as to dispose the battery case cover between the base seat portion of the second terminal member and the first terminal member; and riveting of pressing and squeezing the shaft portion of the second terminal member toward the rear end side of the shaft portion so as to plastically deform the shaft portion; wherein when the riveting is carried out, a region of the shaft portion is pressed and squeezed toward the rear end side, the region projecting from the portion defining the terminal through-hole of the first terminal member toward the front end side, the region being located outside the portion defining the terminal through-hole such that a diameter of the region becomes larger than a diameter of the portion defining the terminal through-hole, the region is deformed into an external enlarged-diameter portion in a disk shape such that the external enlarged-diameter portion comes into contact with the first terminal member and the battery case cover and the first terminal member are held and fixed between the base seat portion and the external enlarged-diameter portion, a region of a hole-inner circumferential surface composing the portion defining the terminal through-hole of the first terminal member, the region being located on a battery case cover side, include a tapered surface gradually enlarged in diameter as the tapered surface extends toward the battery case cover side and opening toward the battery case cover side, when the riveting is carried out, the region of the shaft portion of the second terminal member, the region being located inward of the tapered surface, is enlarged in diameter so as to form an annular projecting portion in contact with the tapered surface, and a hole circumferential portion located around the portion defining the terminal through-hole of the first terminal member is held between the external enlarged-diameter portion and the annular projecting portion so as to fix the first terminal member to the second terminal member.

The manufacturing method for the hermetically sealed battery includes riveting of pressing and squeezing the shaft portion of the second terminal member toward the rear end side (the base seat portion side) of the shaft portion so as to plastically deform the shaft portion. When this riveting is carried out, the region of the shaft portion of the second terminal member, the region that projects toward the front end side from the portion defining the terminal through-hole of the first terminal member and are located outside the portion defining the terminal through-hole, may be pressed and squeezed toward the rear end side so as to be enlarged in diameter (plastically enlarged in diameter) to have larger diameters than a diameter of the portion defining the terminal through-hole, to thereby be deformed (plastically deformed) into the external enlarged-diameter portion in a disk shape, so that the external enlarged-diameter portion may be brought to come in contact with the first terminal member, and the battery case cover and the first terminal member may be held and fixed between the base seat portion and the external enlarged-diameter portion of the second terminal member Further, in the manufacturing method for the hermetically sealed battery, as the first terminal member, there is used the first terminal member in which the region of the hole-inner circumferential surface composing the portion defining the terminal through-hole of the first terminal member, the region being located on the battery case cover side, includes the tapered surface gradually enlarged in diameter as the tapered surface extends toward the battery case cover side and opening toward the battery case cover side. When the riveting is carried out, the region of the shaft portion of the second terminal member, the region being located inward of the tapered surface, may be enlarged in diameter (plastically enlarged in diameter) so as to form the annular projecting portion in contact with the tapered surface, and the hole circumferential portion located around the portion defining the terminal through-hole of the first terminal member may be held between the external enlarged-diameter portion and the annular projecting portion so as to fix the first terminal member to the second terminal member.

In the above manner, by holding the hole circumferential portion located around the portion defining the terminal through-hole of the metallic first terminal member between the external enlarged-diameter portion and the annular projecting portion of the metallic second terminal member so as to fix the first terminal member to the second terminal member, it is possible to firmly connect (mechanically connect) the first terminal member and the second terminal member to each other without welding the first terminal member to the second terminal member.

Further, in the manufacturing method for the hermetically sealed battery, the hole-inner circumferential surface composing the portion defining the terminal through-hole of the first terminal member may include a cylindrical surface in a circular cylindrical shape opening toward an external enlarged-diameter portion side and the tapered surface, and when the riveting is carried out, at least part of a cylindrical-surface inner portion that is the region of the shaft portion of the second terminal member, the region being located inward of the cylindrical surface, may be enlarged in diameter so as to form a pressing-contact portion that presses the cylindrical surface toward a radially outward direction and in contact with the cylindrical surface.

In the manufacturing method, as the first terminal member, there is used the first terminal member in which the hole-inner circumferential surface composing the portion defining the terminal through-hole of the first terminal member includes the cylindrical surface in a circular cylindrical shape opening toward the external enlarged-diameter portion side of the second terminal member and the tapered surface (tapered surface gradually enlarged in diameter as the tapered surface extends toward the battery case cover side and opening toward the battery case cover side). When the riveting is carried out, at least part of the cylindrical-surface inner portion that is the region of the shaft portion of the second terminal member, the region being located inward of the cylindrical surface, may be enlarged in diameter (plastically enlarged in diameter) so as to form the pressing-contact portion that presses the cylindrical surface in the radially outward direction and is in contact with the cylindrical surface.

In this manner, by forming the pressing-contact portion that presses and is in contact with the cylindrical surface of the first terminal member in the radially outward direction in the shaft portion of the second terminal member, it is possible to form an electric conductive path between the first terminal member and the second terminal member via the cylindrical surface of the first terminal member and the pressing-contact portion of the second terminal member. Further, the cylindrical surface of the first terminal member and the pressing-contact portion of the second terminal member are in contact with (tightly adhere to) each other while pressure is applied thereto in the radial direction, thus reducing the contact resistance therebetween to be smaller.

In addition to the form (structure) that holds the hole circumferential portion of the first terminal member between the external enlarged-diameter portion and the annular projecting portion of the second terminal member, there is provided the form (structure) that presses the cylindrical surface of the first terminal member in the radially outward direction by the pressing-contact portion of the second terminal member, to thereby more firmly connect (mechanically connect) the first terminal member and the second terminal member to each other.

Furthermore, in any one of the above manufacturing methods for the hermetically sealed battery, when disposition is carried out, a first insulating member may be interposed between the base seat portion of the second terminal member and the battery case cover, a second insulating member may be interposed between the first terminal member and the battery case cover, the first insulating member, the battery case cover, and the second insulating member may be disposed between the base seat portion and the first terminal member, and when the riveting is carried out, in a state in which region of the first insulating member and the second insulating member, the region being held between the base seat portion and the external enlarged-diameter portion of the second terminal member, is elastically compressed, the first insulating member, the battery case cover, the second insulating member, and the first terminal member may be held and fixed between the base seat portion and the external enlarged-diameter portion.

In the above manufacturing method, when the disposition is carried out, the first insulating member is interposed between the base seat portion of the second terminal member and the battery case cover, the second insulating member is interposed between the first terminal member and the battery case cover, and the first insulating member, the battery case cover, and the second insulating member are disposed between the base seat portion and the first terminal member. Thereafter, when the riveting is carried out, in the state in which the external enlarged-diameter portion formed by riveting the shaft portion of the second terminal member is in contact with the first terminal member, and the region of the first insulating member and the second insulating member, the region being held between the base seat portion and the external enlarged-diameter portion of the second terminal member, is elastically compressed in the holding direction thereof, the first insulating member, the battery case cover, the second insulating member, and the first terminal member may be held and fixed between the base seat portion and the external enlarged-diameter portion of the second terminal member.

Meanwhile, the region of the first insulating member and the second insulating member, the region being held and elastically compressed between the base seat portion and the external enlarged-diameter portion of the second terminal member might permanently be set in fatigue with time. Specifically, because of a creep phenomenon, an elastic reaction force might be deteriorated in the region of the first insulating member and the second insulating member, the region being held and elastically compressed between the base seat portion and the external enlarged-diameter portion of the second terminal member. Due to this influence, a tight adhesiveness between the external enlarged-diameter portion of the second terminal member and the first terminal member might be deteriorated.

To cope with this, in the manufacturing method, as aforementioned, there is employed the structure to hold only the hole circumferential portion of the metallic first terminal member by the external enlarged-diameter portion and the annular projecting portion of the metallic second terminal member; therefore, even if the above-described creep phenomenon of the first insulating member and the second insulating member occurs, the tight adhesiveness (mechanical connection strength) between the external enlarged-diameter portion and the annular projecting portion of the second terminal member, and the first terminal member is prevented from being deteriorated due to the creep phenomenon. Accordingly, even if the above-described creep phenomenon of the first insulating member and the second insulating member occurs, it is possible to maintain the firm connection (mechanical connection) between the first terminal member and the second terminal member.

A second aspect of the present disclosure is a hermetically sealed battery including: a battery case body in a box-shape having an opening; an electrode body accommodated in the battery case body; a battery case cover having a portion defining a cover through-hole, the battery case cover covering the opening of the battery case body; metallic first terminal member having a portion defining a terminal through-hole; and metallic second terminal member that includes a solid cylindrical shaft portion inserted through the portion defining the cover through-hole and the portion defining the terminal through-hole, and base seat portion located on rear end side of the shaft portion, the battery case cover being disposed between the base seat portion of the second terminal member and the first terminal member, wherein the shaft portion of the second terminal member includes: a terminal-through-hole inner portion disposed inside the portion defining the terminal through-hole of the first terminal member; and disk-shaped external enlarged-diameter portion that is a region located on front end side of the shaft portion, the region being located outside the portion defining the terminal through-hole of the first terminal member and having greater diameters than a diameter of portion defining the terminal through-hole, the external enlarged-diameter portion is in contact with the first terminal member, the battery case cover and the first terminal member are held and fixed between the base seat portion and the external enlarged-diameter portion, a region of a hole-inner circumferential surface composing the portion defining the terminal through-hole of the first terminal member, the region being located on a battery case cover side, includes a tapered surface gradually enlarged in diameter as the tapered surface extends toward the battery case cover side and opening toward the battery case cover side, the region of the shaft portion of the second terminal member, the region being located inward of the tapered surface, includes an annular projecting portion in a form that projects radially outward of the shaft portion to be in contact with the tapered surface, and a hole circumferential portion located around the portion defining the terminal through-hole of the first terminal member is held between the external enlarged-diameter portion and the annular projecting portion so as to fix the first terminal member to the second terminal member.

In the hermetically sealed battery, the external enlarged-diameter portion of the shaft portion of the second terminal member may be in contact with the first terminal member, and the battery case cover and the first terminal member may be held and fixed between the base seat portion and the external enlarged-diameter portion of the second terminal member.

Further, in the hermetically sealed battery, the region of the hole-inner circumferential surface composing the portion defining the terminal through-hole of the first terminal member, the region being located on the battery case cover side may include the tapered surface gradually enlarged in diameter as the tapered surface extends toward the battery case cover side and opening toward the battery case cover side. In addition, the region of the shaft portion of the second terminal member, the region being located inward of the tapered surface, includes the annular projecting portion in a form that projects radially outward of the shaft portion to be in contact with the tapered surface. The hole circumferential portion located around the portion defining the terminal through-hole of the first terminal member may be held between the external enlarged-diameter portion of the second terminal member and the annular projecting portion so as to fix the first terminal member to the second terminal member.

In the above manner, by employing the structure to hold the hole circumferential portion located around the portion defining the terminal through-hole of the metallic first terminal member between the external enlarged-diameter portion and the annular projecting portion of the metallic second terminal member so as to fix the first terminal member to the second terminal member, it is possible to provide the hermetically sealed battery in which the first terminal member and the second terminal member are firmly connected (mechanically connected) to each other without welding the first terminal member to the second terminal member.

Further, in the hermetically sealed battery, the hole-inner circumferential surface composing the portion defining the terminal through-hole of the first terminal member may include a cylindrical surface in a circular cylindrical shape opening toward an external enlarged-diameter portion side and the tapered surface, and a cylindrical-surface inner portion that is the region of the shaft portion of the second terminal member, the region being located inward of the cylindrical surface, may include pressing-contact portion that presses the cylindrical surface toward a radially outward direction and in contact with the cylindrical surface.

In the hermetically sealed battery, the hole-inner circumferential surface composing the portion defining the terminal through-hole of the first terminal member may include the cylindrical surface in a circular cylindrical shape opening toward the external enlarged-diameter portion side of the second terminal member and the tapered surface (tapered surface gradually enlarged in diameter as the tapered surface extends toward the battery case cover side and opening toward the battery case cover side). The cylindrical-surface inner portion that is the region of the shaft portion of the second terminal member, the region being located inward of the cylindrical surface may include the pressing-contact portion that presses the cylindrical surface toward the radially outward direction and is in contact with the cylindrical surface.

In this manner, by structuring the pressing-contact portion of the shaft portion of the second terminal member to press and be in contact with the cylindrical surface of the first terminal member in the radially outward direction, it may be possible to form an electric conductive path between the first terminal member and the second terminal member via the cylindrical surface of the first terminal member and the pressing-contact portion of the second terminal member. Further, since the cylindrical surface of the first terminal member and the pressing-contact portion of the second terminal member are in contact with (tightly adhere to) each other while pressure is applied thereto in the radial direction, it may be possible to reduce the contact resistance therebetween to be smaller.

In addition to the structure to hold the hole circumferential portion of the first terminal member between the external enlarged-diameter portion and the annular projecting portion of the second terminal member, by employing the structure to press the cylindrical surface of the first terminal member in the radially outward direction by the pressing-contact portion of the second terminal member, it may be possible to more firmly connect (mechanically connect) the first terminal member and the second terminal member to each other.

Furthermore, in any one of the above hermetically sealed batteries, the hermetically sealed battery may further include: a first insulating member interposed between the base seat portion of the second terminal member and the battery case cover; and a second insulating member interposed between the first terminal member and the battery case cover, wherein in a state in which a region of the first insulating member and the second insulating member, the region being held between the base seat portion and the external enlarged-diameter portion of the second terminal member, is elastically compressed, the first insulating member, the battery case cover, the second insulating member, and the first terminal member may be held and fixed between the base seat portion and the external enlarged-diameter portion.

In the hermetically sealed battery, in the state in which the region of the first insulating member and the second insulating member, the region being held between the base seat portion and the external enlarged-diameter portion of the second terminal member, is elastically compressed in the holding direction thereof, the first insulating member, the battery case cover, the second insulating member, and the first terminal member are held and fixed between the base seat portion and the external enlarged-diameter portion.

Meanwhile, the region of the first insulating member and the second insulating member, the region being held and elastically compressed between the base seat portion and the external enlarged-diameter portion of the second terminal member might permanently be set in fatigue with time. Specifically, because of a creep phenomenon, an elastic reaction force might be deteriorated in the region of the first insulating member and the second insulating member, the region being held and elastically compressed between the base seat portion and the external enlarged-diameter portion of the second terminal member. Due to this influence, a tight adhesiveness between the external enlarged-diameter portion of the second terminal member and the first terminal member might be deteriorated.

To cope with this, as aforementioned, the hermetically sealed battery has the structure to hold only the hole circumferential portion of the metallic first terminal member by the external enlarged-diameter portion and the annular projecting portion of the metallic second terminal member; therefore, even if the above-described creep phenomenon of the first insulating member and the second insulating member occurs, the tight adhesiveness (mechanical connection strength) between the external enlarged-diameter portion and the annular projecting portion of the second terminal member, and the first terminal member is prevented from being deteriorated due to the above-described creep phenomenon. Accordingly, even if the creep phenomenon of the first insulating member and the second insulating member occurs, it may be possible to maintain the firm connection (mechanical connection) between the first terminal member and the second terminal member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

DETAILED DESCRIPTION OF EMBODIMENTS (Embodiment) Hereinafter, an embodiment of the present disclosure will be descried with reference to the drawings. FIG. 1 is a cross sectional view of a hermetically sealed battery 100 according to the embodiment. FIG. 2 is an enlarged view of a part B and a part C in FIG. 1. Components in the part C that are different from those in the part B are indicated by reference numerals in parentheses in FIG. 2. FIG. 4 is a perspective view showing a partially exploded cover member with terminals 115 according to the embodiment.

As shown in FIG. 1, the hermetically sealed battery 100 according to the present embodiment is a lithium ion secondary battery including a battery case body 111 in a rectangular box shape having an opening 111d, and an electrode body 150 accommodated in the battery case body 111. The hermetically sealed battery 100 includes a battery case cover 113 in a platy shape to cover the opening 111d of the battery case body 111. The battery case body 111 and the battery case cover 113 are integrated with each other through welding so as to compose a battery case 110.

The battery case cover 113 has a rectangular shape, and portions 113h, 113k, which define circular-shaped cover through-holes extending through the battery case cover 113, are formed at both longitudinal end portions (a lateral direction in FIG. 1) of the battery case cover 113. A safety valve 113j is provided at a longitudinal center position of the battery case cover 113. This safety valve 113j is integrally formed with the battery case cover 113 so as to compose a part of the battery case cover 113.

Figure 4:
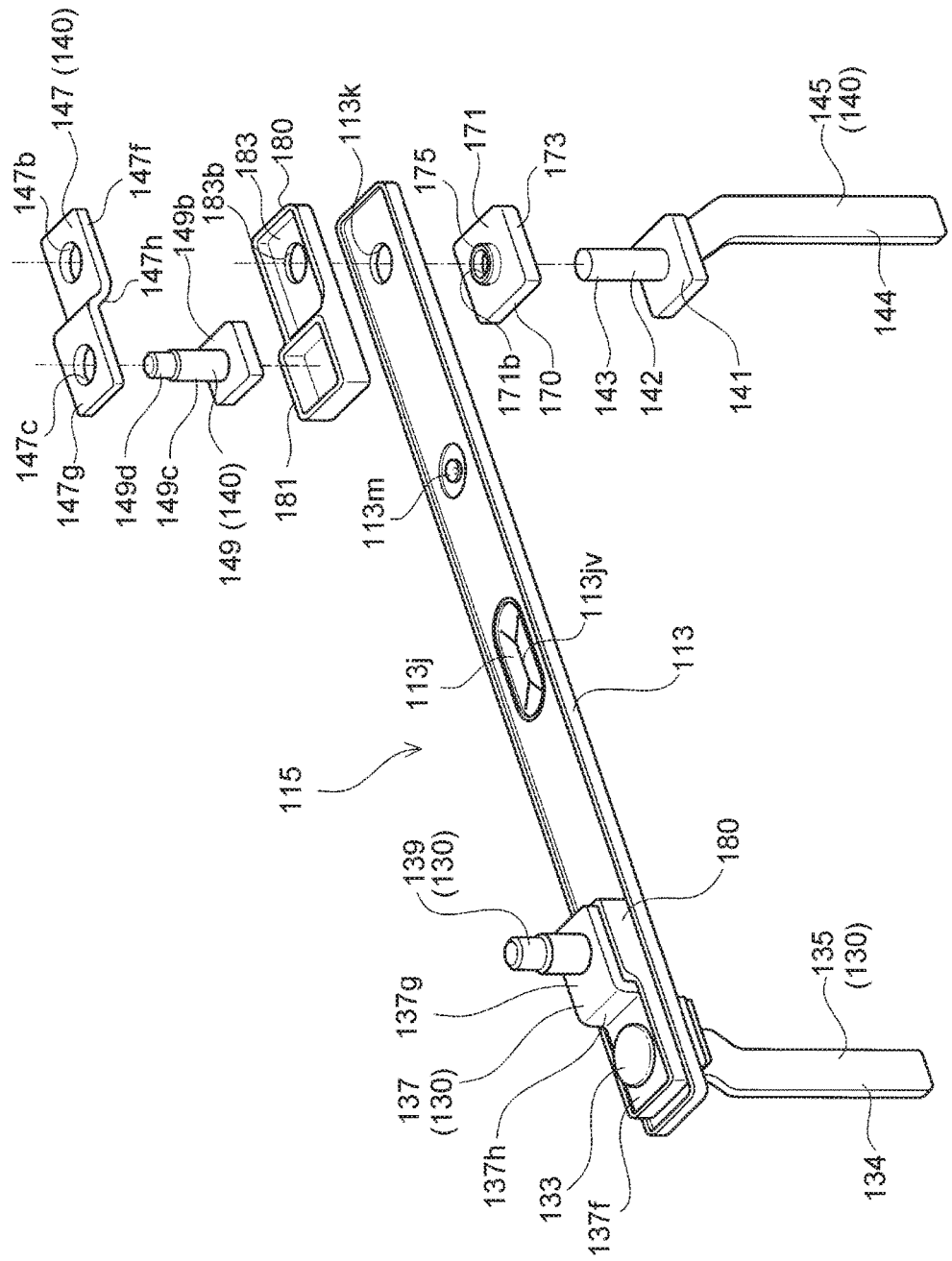
FIG. 4 is an exploded perspective view of a cover member with terminals according to the embodiment.

The safety valve 113j is formed to be thinner than the other portions of the battery case cover 113, and is formed on an upper surface thereof with a groove portion 113jv (see FIG. 4). Through this configuration, the safety valve 113j starts operating when the inner pressure inside the battery case 110 reaches a predetermined pressure. That is, when the inner pressure reaches the predetermined pressure, the groove portion 113jv becomes broken to discharge a gas in the battery case 110.

Figure 1:
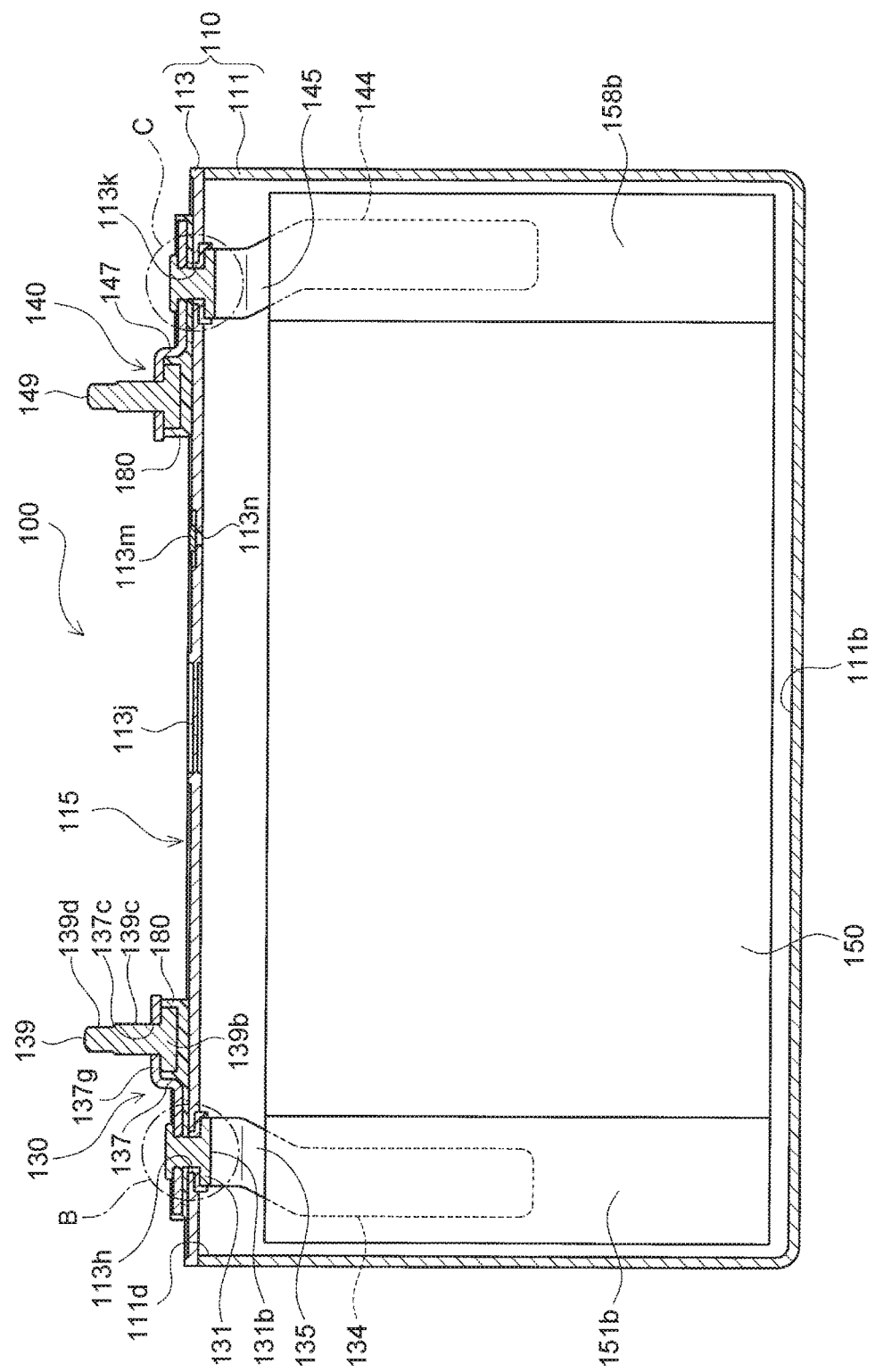
FIG. 1 is a longitudinal sectional view of a hermetically sealed battery according to an embodiment.

Between the safety valve 113j and the portion 113k defining the cover through-hole of the battery case cover 113, there is formed a liquid filling port 113n to fill an electrolytic solution (not shown) into the battery case 110 (see FIG. 1). This liquid filling port 113n is sealed by a liquid filling plug 113m.

Figure 7:
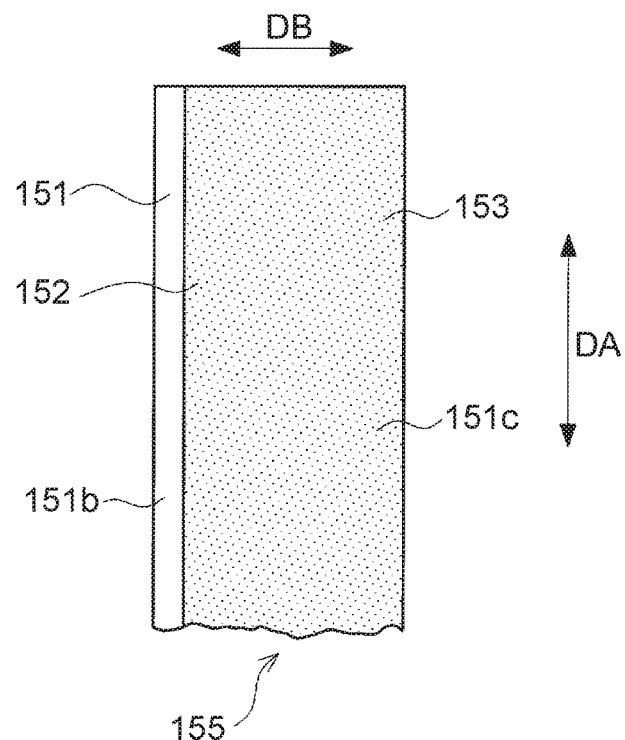
FIG. 7 is a view showing a positive electrode plate composing the same electrode body.

The electrode body 150 is a flat-type wound electrode body formed by winding into a flat shape a positive electrode plate 155, a negative electrode plate 156, and a separator 157 that are in a belt-shape (see FIG. 6 to FIG. 9). Among these components, as shown in FIG. 7, the positive electrode plate 155 includes a positive-electrode base member 151 that is in a belt-shape extending in a longitudinal direction DA and is made of an aluminum foil, and a positive-electrode composite layer 152 disposed on a part of a surface of this positive-electrode base member 151. The positive-electrode composite layer 152 includes a positive-electrode active material 153, an electric conductive material, and a binding agent.

A region of the positive-electrode base member 151, the region on which the positive-electrode composite layer 152 is applied, is referred to as a positive-electrode composite-applied portion 151c. On the other hand, a portion thereof on which no positive-electrode composite layer 152 is applied is referred to as a positive-electrode-composite non-applied portion 151b. The positive-electrode-composite non-applied portion 151b is located at a position of an end portion (a left end portion in FIG. 7) in a width direction DB (a lateral direction in FIG. 7) of the positive-electrode base member 151 (the positive electrode plate 155), and extends in a belt shape in the longitudinal direction DA of the positive-electrode base member 151 (the positive electrode plate 155) along one longer side of the positive-electrode base member 151 (the positive electrode plate 155).

Figure 8:
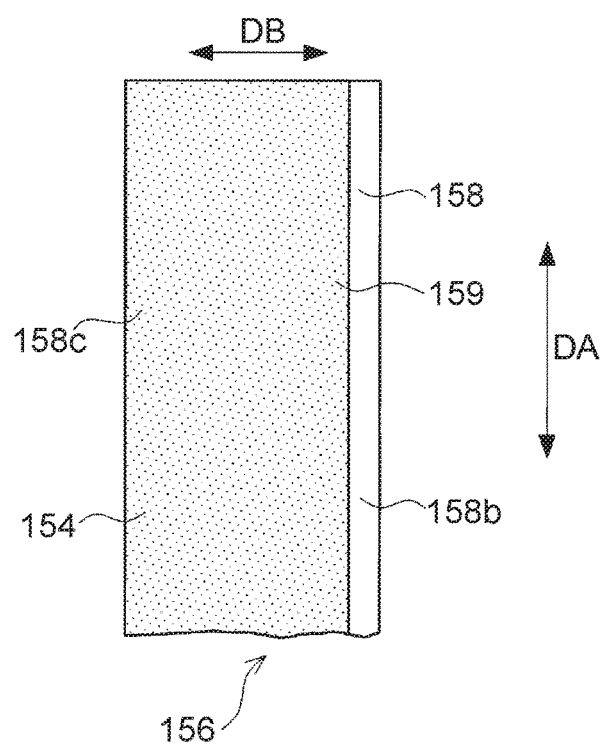
FIG. 8 is a view showing a negative electrode plate composing the same electrode body.

As shown in FIG. 8, the negative electrode plate 156 includes a negative-electrode base member 158 that is in a belt-shape extending in the longitudinal direction DA and is made of a copper foil, and a negative-electrode composite layer 159 disposed on a part of a surface of this negative-electrode base member 158. The negative-electrode composite layer 159 includes a negative-electrode active material 154 and a binding agent.

A region of the negative-electrode base member 158, the region on which the negative-electrode composite layer 159 is applied, is referred to as a negative-electrode composite-applied portion 158c. On the other hand, a region of the negative-electrode base member 158, the region on which no negative-electrode composite layer 159 is applied is referred to as a negative-electrode-composite non-applied portion 158b. The negative-electrode-composite non-applied portion 158b extends in a belt shape in the longitudinal direction DA (a vertical direction in FIG. 8) of the negative-electrode base member 158 (the negative electrode plate 156) along one longer side of the negative-electrode base member 158 (the negative electrode plate 156).

In addition, the hermetically sealed battery 100 includes electrode terminal members (a positive-electrode terminal member 130 and a negative-electrode terminal member 140) that are connected to the electrode body 150 inside the battery case body 111, and extend via the portions 113h, 113k that define cover through-holes of the battery case cover 113 to the outside.

The positive-electrode terminal member 130 is composed of a positive-electrode first terminal member 137, a positive-electrode second terminal member 135, and a positive-electrode coupling member 139 (bolt) (see FIG. 1, FIG. 4). Among these components, the positive-electrode second terminal member 135 is made of metal, is connected to the electrode body 150, and extends via the portion 113h that defines the cover through-hole of the battery case cover 113 to the outside. The positive-electrode first terminal member 137 is made of metal, is located on the battery case cover 113 (outside the battery case 110), and is electrically connected to the positive-electrode second terminal member 135 outside the battery case 110. The positive-electrode coupling member 139 is made of metal, is located on the battery case cover 113 (outside the battery case 110), and is electrically connected (or connectable) to the positive-electrode first terminal member 137.

Specifically, the positive-electrode second terminal member 135 includes a base seat portion 131, a shaft portion 132, and an electrode-body connecting portion 134 (see FIG. 1 to FIG. 4). Among these components, the base seat portion 131 is formed in a rectangular shape, and is disposed inside the battery case body 111. The shaft portion 132 has a solid cylindrical shape extending from an upper surface 131f of the base seat portion 131 toward a front end side DX1 in an axial direction DX. Further, the shaft portion 132 extends through the portion 113h defining the cover through-hole of the battery case cover 113 and a portion 137b defining a terminal through-hole of the positive-electrode first terminal member 137 to the outside of the battery case 110 (the battery case body 111).

Figure 2:
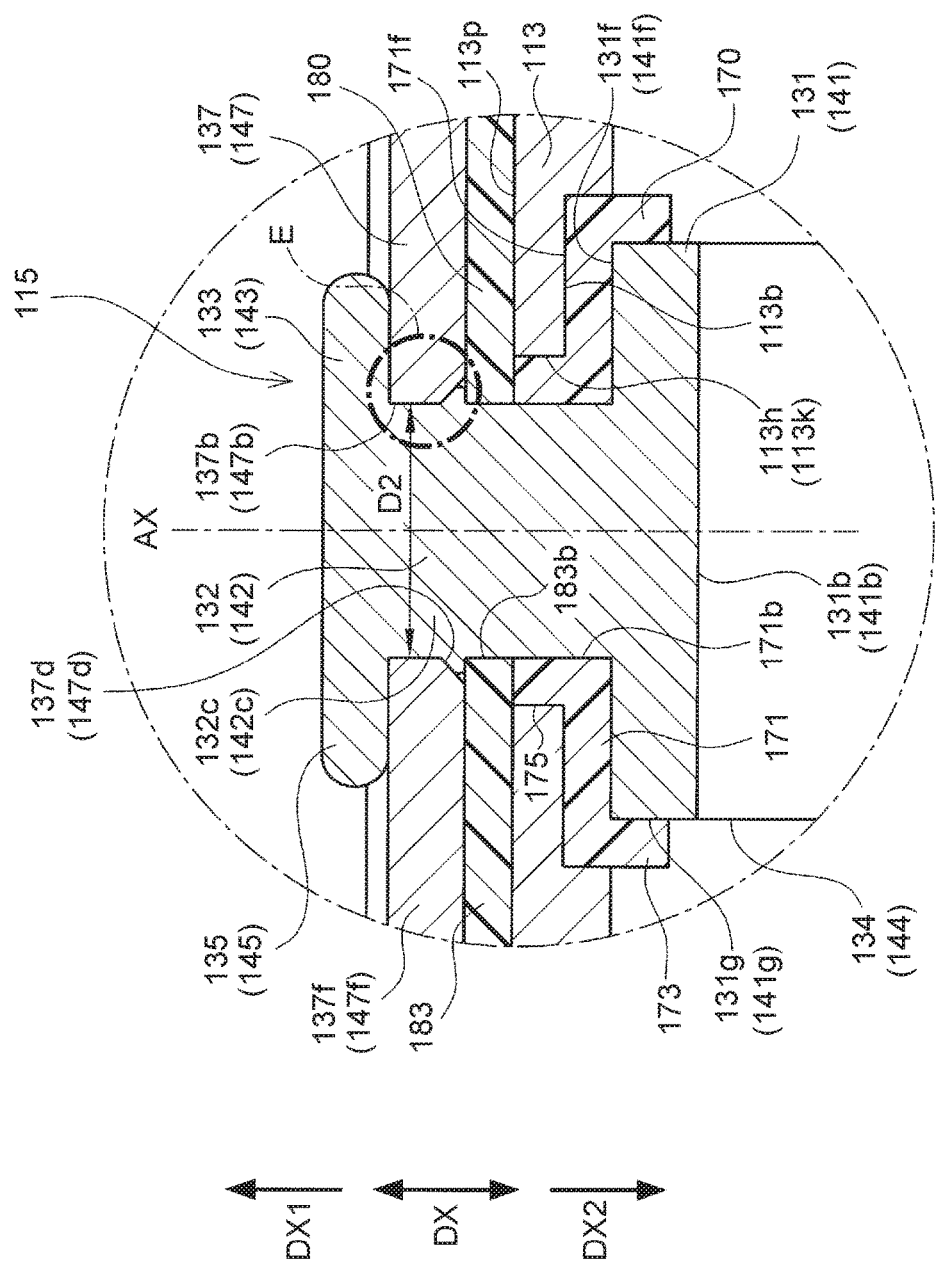
FIG. 2 is an enlarged view of a part B and a part C in FIG. 1.

As shown in FIG. 2, this shaft portion 132 includes a terminal-through-hole inner portion 132c and an external enlarged-diameter portion 133 adjacent to the terminal-through-hole inner portion 132c on the axial-direction front end side DX1 (the upward direction in FIG. 2). Of these components, the terminal-through-hole inner portion 132c is a region that is in a circular cylindrical shape, and is located inside a portion 137b defining the terminal through-hole of the positive-electrode first terminal member 137. On the other hand, the external enlarged-diameter portion 133 is a region that is located on the front end side of the shaft portion 132 (upward of FIG. 2), is located outside the portion 137b defining the terminal through-hole of the positive-electrode first terminal member 137, and is a disk-shaped region having a larger diameter than an inner diameter of the portion 137b defining the terminal through-hole. Hence, the external enlarged-diameter portion 133 has a larger diameter than that of the terminal-through-hole inner portion 132c.

Of the shaft portion 132 extending in the axial direction DX (a direction extending along an axial line AX, the vertical direction in FIG. 2), the base seat portion 131 side (a downward direction in FIG. 2) is defined as a rear end side of the shaft portion 132, and the opposite side (an upward direction in FIG. 2) to this side is defined as a front end side of the shaft portion 132. In the axial direction DX, a direction extending from the rear end side toward the front end side of the shaft portion 132 is defined as the axial-direction front end side DX1 (the upward direction in FIG. 2), and an opposite direction to this direction is defined as an axial-direction rear end side DX2 (the downward direction in FIG. 2). A shaft portion 142 described later has the same configuration.

The electrode-body connecting portion 134 has a form that extends from a lower surface 131b of the base seat portion 131 toward a bottom surface 111b of the battery case body 111, and is joined (welded) to the positive-electrode-composite non-applied portion 151b of the electrode body 150. Through this, the positive-electrode second terminal member 135 and the electrode body 150 are electrically and mechanically connected to each other.

The positive-electrode first terminal member 137 is made of a metallic plate, and has a substantially Z shape in the side view. This positive-electrode first terminal member 137 includes a fixed portion 137f fixed by the external enlarged-diameter portion 133, a connected portion 137g connected to the positive-electrode coupling member 139, and a coupling portion 137h coupling the fixed portion 137f to the connected portion 137g. The fixed portion 137f is formed with a portion 137b defining a terminal through-hole extending therethrough, and the shaft portion 132 of the positive-electrode second terminal member 135 is inserted through the portion 137b defining this terminal through-hole. The connected portion 137g is formed with a portion 137c defining a through-hole extending therethrough.

The positive-electrode coupling member 139 is a metallic bolt, and includes a head portion 139b in a rectangular shape, and a shaft portion 139c in a circular cylindrical shape. A region located on the front end side of the shaft portion 139c is formed to be a treaded portion 139d. The shaft portion 139c of the positive-electrode coupling member 139 is inserted through the portion 137c defining the through-hole of the positive-electrode first terminal member 137.

In the hermetically sealed battery 100 of the present embodiment, the battery case cover 113 is disposed between the base seat portion 131 of the positive-electrode second terminal member 135 and the positive-electrode first terminal member 137. The external enlarged-diameter portion 133 of the positive-electrode second terminal member 135 is in contact with the fixed portion 137f of the positive-electrode first terminal member 137, and the battery case cover 113 and the positive-electrode first terminal member 137 are held and fixed between the base seat portion 131 of the positive-electrode second terminal member 135 and the external enlarged-diameter portion 133. The external enlarged-diameter portion 133 of the positive-electrode second terminal member 135 comes into contact with the fixed portion 137f of the positive-electrode first terminal member 137, to thereby electrically connect the positive-electrode second terminal member 135 and the positive-electrode first terminal member 137 to each other.

The negative-electrode terminal member 140 is composed of a negative-electrode second terminal member 145, a negative-electrode first terminal member 147, and a negative-electrode coupling member 149 (bolt) (see FIG. 1, FIG. 4). Among these components, the negative-electrode second terminal member 145 is made of metal, is connected to the electrode body 150, and extends via the portion 113k defining the cover through-hole of the battery case cover 113 to the outside. The negative-electrode first terminal member 147 is made of metal, is located on the battery case cover 113 (outside the battery case 110), and is electrically connected to the negative-electrode second terminal member 145 outside the battery case 110. The negative-electrode coupling member 149 is made of metal, is located on the battery case cover 113 (outside the battery case 110), and is electrically connected (or connectable) to the negative-electrode first terminal member 147.

Specifically, the negative-electrode second terminal member 145 includes a base seat portion 141, a shaft portion 142, and an electrode-body connecting portion 144 (see FIG. 1 to FIG. 4). Among these components, the base seat portion 141 has a rectangular shape, and is located inside the battery case body 111. The shaft portion 142 has a solid cylindrical shape projecting from an upper surface 141f of the base seat portion 141, and extends through the portion 113k defining the cover through-hole of the battery case cover 113 and a portion 147b defining a terminal through-hole of the negative-electrode first terminal member 147 to the outside of the battery case 110 (the battery case body 111).

As shown in FIG. 2, this shaft portion 142 includes a terminal-through-hole inner portion 142c and an external enlarged-diameter portion 143 adjacent to the terminal-through-hole inner portion 142c on the axial-direction front end side DX1 (the upward direction in FIG. 2). Of these components, the terminal-through-hole inner portion 142c is a region that is in a circular cylindrical shape, and is located inside the portion 147b defining the terminal through-hole of the negative-electrode first terminal member 147. On the other hand, the external enlarged-diameter portion 143 is a region that is located on the front end side of the shaft portion 142 (upward of FIG. 2), is located outside the portion 147b defining the terminal through-hole of the negative-electrode first terminal member 147, and is a disk-shaped region having a larger diameter than an inner diameter of the portion 147b defining the terminal through-hole. Hence, the external enlarged-diameter portion 143 has a larger diameter than that of the terminal-through-hole inner portion 142c.

The electrode-body connecting portion 144 has a form that extends from a lower surface 141b of the base seat portion 141 toward the bottom surface 111b of the battery case body 111, and is joined (welded) to the negative-electrode-composite non-applied portion 158b of the electrode body 150. Through this, the negative-electrode second terminal member 145 and the electrode body 150 are electrically and mechanically connected to each other.

The negative-electrode first terminal member 147 is made of a metallic plate, and has a substantially Z shape in the side view. This negative-electrode first terminal member 147 includes a fixed portion 147f fixed by the external enlarged-diameter portion 143, a connected portion 147g connected to the negative-electrode coupling member 149, and a coupling portion 147h coupling the fixed portion 147f to the connected portion 147g. The fixed portion 147f is formed with a portion 147b defining a terminal through-hole extending therethrough, and the shaft portion 142 of the negative-electrode second terminal member 145 is inserted through the portion 147*b* defining this terminal through-hole. The connected portion 147*g* is formed with a portion 147*c* defining a through-hole extending therethrough.

The negative-electrode coupling member 149 is a metallic bolt, and includes a head portion 149*b* in a rectangular shape, and a shaft portion 149*c* in a circular cylindrical shape. A region located on the front end side of the shaft portion 149*c* is formed to be a treaded portion 149*d*. The shaft portion 149*c* of the negative-electrode coupling member 149 is inserted through the portion 147*c* defining the through-hole of the negative-electrode first terminal member 147.

In the present embodiment, the battery case cover 113 is disposed between the base seat portion 141 of the negative-electrode second terminal member 145 and the negative-electrode first terminal member 147. The external enlarged-diameter portion 143 of the negative-electrode second terminal member 145 is in contact with the fixed portion 147*f* of the negative-electrode first terminal member 147, and the battery case cover 113 and the negative-electrode first terminal member 147 are held and fixed between the base seat portion 141 of the negative-electrode second terminal member 145 and the external enlarged-diameter portion 143. The external enlarged-diameter portion 143 of the negative-electrode second terminal member 145 comes into contact with the fixed portion 147*f* of the negative-electrode first terminal member 147, to thereby electrically connect the negative-electrode second terminal member 145 and the negative-electrode first terminal member 147 to each other.

In addition, the hermetically sealed battery 100 of the present embodiment further includes a first insulating member 170 disposed between the positive-electrode second terminal member 135 and the battery case cover 113 so as to electrically insulate both members. This first insulating member 170 is also disposed between the negative-electrode terminal member 140 (specifically, the negative-electrode second terminal member 145) and the battery case cover 113.

This first insulating member 170 is made of an elastically deformable resin having an electric insulation property, and includes a first interposed portion 171, an insulating side-wall portion 173, and an insulation inserted portion 175 (see FIG. 2, FIG. 4). Among these components, the first interposed portion 171 has a flat platy shape, and is provided at a center thereof with a portion 171*b* defining a circular through-hole through which the shaft portion 132 (the shaft portion 142) of the positive-electrode second terminal member 135 (the negative-electrode second terminal member 145) is inserted. This first interposed portion 171 is interposed between an upper surface 131*f* (upper surface 141*f*) of the base seat portion 131 (the base seat portion 141) of the positive-electrode second terminal member 135 (the negative-electrode second terminal member 145) and a lower surface 113*b* of the battery case cover 113.

The insulating side-wall portion 173 is a side wall portion in a rectangular annular shape located at a circumferential edge of the first interposed portion 171. This insulating side-wall portion 173 surrounds an outer circumferential side surface 131*g* (an outer circumferential side surface 141*g*) of the base seat portion 131 (the base seat portion 141).

The insulation inserted portion 175 is formed in a cylindrical shape projecting from the upper surface 171*f* of the first interposed portion 171. This insulation inserted portion 175 has a form that surrounds the periphery of the shaft portion 132 (the shaft portion 142) of the positive-electrode second terminal member 135 (the negative-electrode second terminal member 145), and is inserted into the portion 113*h* defining the cover through-hole of the battery case cover 113 (the portion 113*k* defining the cover through-hole).

In addition, the hermetically sealed battery 100 includes a second insulating member 180 that is formed of an elastically deformable resin having an electric insulation property and is disposed on the battery case cover 113. This second insulating member 180 is interposed between the positive-electrode terminal member 130 (specifically, the positive-electrode first terminal member 137 and the positive-electrode coupling member 139) and an upper surface 113*p* of the battery case cover 113 so as to electrically insulate both components. This second insulating member 180 is also interposed between the negative-electrode terminal member 140 (specifically, the negative-electrode first terminal member 147 and the negative-electrode coupling member 149) and the battery case cover 113.

Specifically, the second insulating member 180 includes a head disposition portion 181 on which the head portion 139*b* (the head portion 149*b* of the negative-electrode coupling member 149) of the positive-electrode coupling member 139 is disposed and a second interposed portion 183 interposed between the positive-electrode first terminal member 137 (the negative-electrode first terminal member 147) and the upper surface 113*p* of the battery case cover 113. The fixed portion 137*f* of the positive-electrode first terminal member 137 (the fixed portion 147*f* of the negative-electrode first terminal member 147) is disposed on the second interposed portion 183. The second interposed portion 183 is formed with a portion 183*b* defining a through-hole extending therethrough, and the shaft portion 132 of the positive-electrode second terminal member 135 (the shaft portion 142 of the negative-electrode second terminal member 145) is inserted through the portion 183*b* defining this through-hole.

In the present embodiment, the positive-electrode first terminal member 137, the second insulating member 180, the battery case cover 113, and the first insulating member 170 are held and fixed between the base seat portion 131 of the positive-electrode second terminal member 135 and the external enlarged-diameter portion 133 with a compressive force applied to them in the axial direction DX (see FIG. 2). Similarly, the negative-electrode first terminal member 147, the second insulating member 180, the battery case cover 113, and the first insulating member 170 are held and fixed between the base seat portion 141 of the negative-electrode second terminal member 145 and the external enlarged-diameter portion 143 with a compressive force applied to them in the axial direction DX (see FIG. 2).

Through this, in the present embodiment, the battery case cover 113, the positive-electrode terminal member 130 (the positive-electrode first terminal member 137, the positive-electrode second terminal member 135, and the positive-electrode coupling member 139), the negative-electrode terminal member 140 (the negative-electrode first terminal member 147, the negative-electrode second terminal member 145, and the negative-electrode coupling member 149), the first insulating members 170, 170, and the second insulating members 180, 180 are integrated into the cover member with terminals 115 (see FIG. 4).

The first interposed portion 171 of the first insulating member 170 is held between the base seat portion 131 (141) and the external enlarged-diameter portion 133 (143) in a state of being elastically compressed in the axial direction DX. Through this, it is possible to properly seal a part between the base seat portions 131, 141 and the battery case cover 113. In addition, the second interposed portion 183 of the second insulating member 180 is also held between the base seat portion 131 (141) and the external enlarged-diameter portion 133 (143) in a state of being elastically compressed in the axial direction DX. Through this, it is possible to properly seal a part between the positive-electrode first terminal member 137 (the negative-electrode first terminal member 147) and the battery case cover 113.

Figure 3:
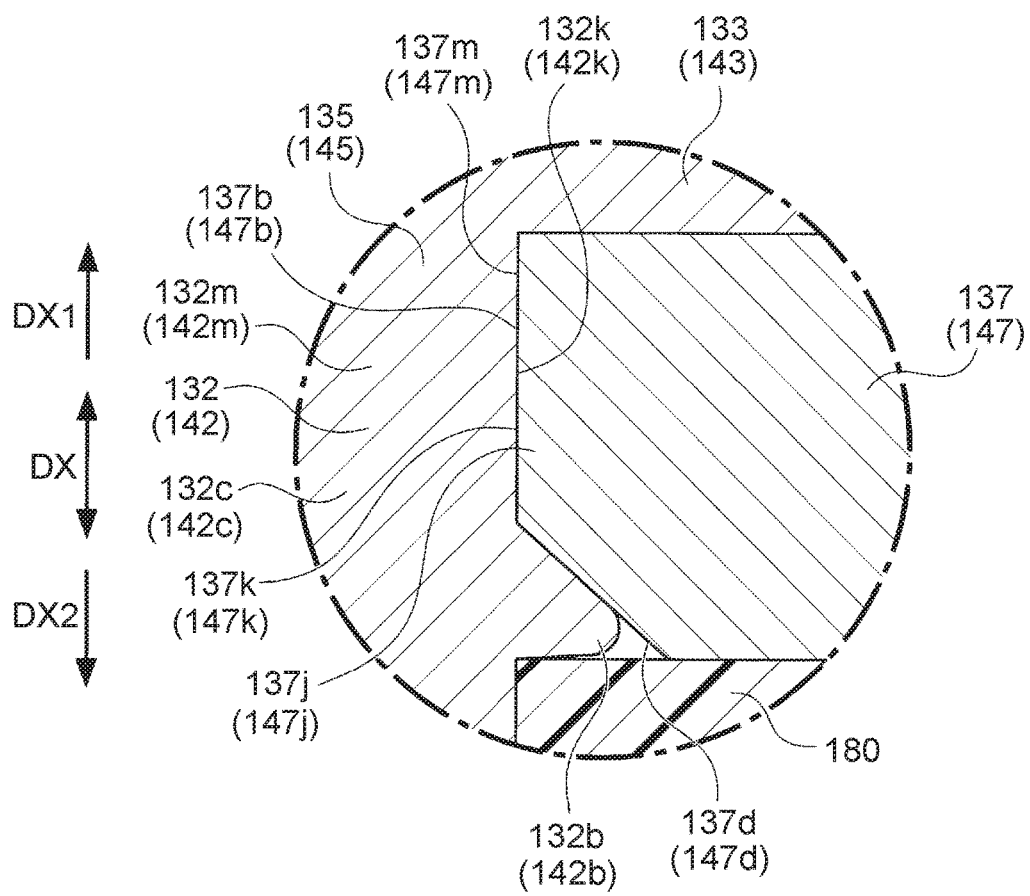
FIG. 3 is an enlarged view of a part E in FIG. 2.

Meanwhile, in the hermetically sealed battery 100 of the present embodiment, as shown in FIG. 2 and FIG. 3, a region of a hole-inner circumferential surface 137k composing the portion 137b defining the terminal through-hole of the positive-electrode first terminal member 137, the region being located on the battery case cover 113 side (the axial-direction rear end side DX2, in the downward direction in FIG. 2 and FIG. 3) includes a tapered surface 137d gradually enlarged in diameter as this goes toward the battery case cover 113 side, and opening toward the battery case cover 113 side. In addition, a region of the shaft portion 132 of the positive-electrode second terminal member 135, the region being located inward (radially inward) of the tapered surface 137d, has an annular projecting portion 132b so projecting radially outward of the shaft portion 132 as to be in contact with the tapered surface 137d. In addition, a hole circumferential portion 137j located around the portion 137b defining the terminal through-hole of the positive-electrode first terminal member 137 is held between the external enlarged-diameter portion 133 of the positive-electrode second terminal member 135 and the annular projecting portion 132b, to thereby fix the positive-electrode first terminal member 137 to the positive-electrode second terminal member 135.

As with this, a region of a hole-inner circumferential surface 147k composing the portion 147b defining the terminal through-hole of the negative-electrode first terminal member 147, the region being located on the battery case cover 113 side (the axial-direction rear end side DX2, in the downward direction in FIG. 2 and FIG. 3) includes a tapered surface 147d gradually enlarged in diameter as this goes toward the battery case cover 113 side, and opening toward the battery case cover 113 side. In addition, a region of the shaft portion 142 of the negative-electrode second terminal member 145, the region being located inward (radially inward) of the tapered surface 147d, has an annular projecting portion 142b so projecting radially outward of the shaft portion 142 as to be in contact with the tapered surface 147d. In addition, a hole circumferential portion 147j located around the portion 147b defining the terminal through-hole of the negative-electrode first terminal member 147 is held between the external enlarged-diameter portion 143 of the negative-electrode second terminal member 145 and the annular projecting portion 142b, to thereby fix the negative-electrode first terminal member 147 to the negative-electrode second terminal member 145.

In this manner, by employing the structure to hold the hole circumferential portion 137j (147j) located around the portion 137b (147b) defining the terminal through-hole of the metallic positive-electrode first terminal member 137 (the negative-electrode first terminal member 147) between the external enlarged-diameter portion 133 (143) of the metallic positive-electrode second terminal member 135 (the negative-electrode second terminal member 145) and the annular projecting portion 132b (142b), to thereby fix the positive-electrode first terminal member 137 (the negative-electrode first terminal member 147) to the positive-electrode second terminal member 135 (the negative-electrode second terminal member 145), it is possible to firmly connect (mechanically connect) the positive-electrode first terminal member 137 (the negative-electrode first terminal member 147) to the positive-electrode second terminal member 135 (the negative-electrode second terminal member 145) without welding the positive-electrode first terminal member 137 (the negative-electrode first terminal member 147) to the positive-electrode second terminal member 135 (the negative-electrode second terminal member 145).

Regions of the first insulating member 170 and the second insulating member 180 (specifically, the first interposed portion 171 and the second interposed portion 183), the regions being held and elastically compressed between the base seat portion 131 (141) and the external enlarged-diameter portion 133 (143) of the positive-electrode second terminal member 135 (the negative-electrode second terminal member 145) might be permanently set in fatigue with time. Specifically, because of a creep phenomenon, an elastic reaction force might be deteriorated in the first interposed portion 171 of the first insulating member 170 and the second interposed portion 183 of the second insulating member 180. Due to this influence, a tight adhesiveness between the external enlarged-diameter portion 133 (143) of the positive-electrode second terminal member 135 (the negative-electrode second terminal member 145) and the positive-electrode first terminal member 137 (the negative-electrode first terminal member 147) might be deteriorated.

To cope with this, the hermetically sealed battery 100 of the present embodiment has the connecting structure to hold only the hole circumferential portion 137j (147j) located around the portion 137b (147b) defining the terminal through-hole of the metallic positive-electrode first terminal member 137 (negative-electrode first terminal member 147), without holding the first insulating member 170 and the second insulating member 180 between the external enlarged-diameter portion 133 (143) of the metallic positive-electrode second terminal member 135 (the negative-electrode second terminal member 145) and the annular projecting portion 132b (142b). According to such a connecting structure, the tight adhesiveness (mechanical connection strength) between the external enlarged-diameter portion 133 (143) of the positive-electrode second terminal member 135 (the negative-electrode second terminal member 145) and the annular projecting portion 132b (142b), and the positive-electrode first terminal member 137 (the negative-electrode first terminal member 147) is prevented from being deteriorated due to the influence of the above-described creep phenomenon. Accordingly, in the hermetically sealed battery 100 of the present embodiment, even if the above-described creep phenomenon occurs, it is possible to maintain the firm connection (mechanical connection) between the positive-electrode first terminal member 137 (the negative-electrode first terminal member 147) and the positive-electrode second terminal member 135 (the negative-electrode second terminal member 145).

In the hermetically sealed battery 100 of the present embodiment, the hole-inner circumferential surface 137k (147k) composing the portion 137b (147b) defining the terminal through-hole of the positive-electrode first terminal member 137 (the negative-electrode first terminal member 147) is composed by the tapered surface 137d (147d) and a cylindrical surface 137m (147m) in a circular cylindrical shape extending toward the axial-direction front end side DX1 from the front end of the tapered surface 137d (147d) in a manner as to open toward the external enlarged-diameter portion 133 (143) side (in the upward direction in FIG. 2 and FIG. 3). A cylindrical-surface inner portion 132m (142m) that is a region of the shaft portion 132 (142) of the positive-electrode second terminal member 135 (the negative-electrode second terminal member 145), the region being located inward (radially inward) of the cylindrical surface 137m (147m), includes a pressing-contact portion 132k (142k) that presses the cylindrical surface 137m (147m) in the radially outward direction, and is in contact with the cylindrical surface 137m (147m).

In this manner, by employing the structure that the pressing-contact portion 132k (142k) of the shaft portion 132 (142) of the positive-electrode second terminal member 135 (the negative-electrode second terminal member 145) presses the cylindrical surface 137m (147m) of the positive-electrode first terminal member 137 (the negative-electrode first terminal member 147) in the radially outward direction, and is in contact with the cylindrical surface 137m (147m), it is possible to form an electric conductive path between the positive-electrode first terminal member 137 (the negative-electrode first terminal member 147) and the positive-electrode second terminal member 135 (the negative-electrode second terminal member 145) via the cylindrical surface 137m (147m) of the positive-electrode first terminal member 137 (the negative-electrode first terminal member 147) and the pressing-contact portion 132k (142k) of the positive-electrode second terminal member 135 (the negative-electrode second terminal member 145). Further, the cylindrical surface 137m (147m) of the positive-electrode first terminal member 137 (the negative-electrode first terminal member 147) and the pressing-contact portion 132k (142k) of the positive-electrode second terminal member 135 (the negative-electrode second terminal member 145) are in contact with (tightly adhere to) each other while pressure is applied thereto in the radial direction, thus reducing the contact resistance therebetween to be smaller.

In addition to the structure to hold the hole circumferential portion 137j (147j) of the positive-electrode first terminal member 137 (the negative-electrode first terminal member 147) between the external enlarged-diameter portion 133 (143) and the annular projecting portion 132b (142b) of the positive-electrode second terminal member 135 (the negative-electrode second terminal member 145), there is provided the structure to press the cylindrical surface 137m (147m) of the positive-electrode first terminal member 137 (the negative-electrode first terminal member 147) in the radially outward direction by the pressing-contact portion 132k (142k) of the positive-electrode second terminal member 135 (the negative-electrode second terminal member 145), to thereby more firmly connect (mechanically connect) the positive-electrode first terminal member 137 (the negative-electrode first terminal member 147) and the positive-electrode second terminal member 135 (the negative-electrode second terminal member 145) to each other.

Figure 10:
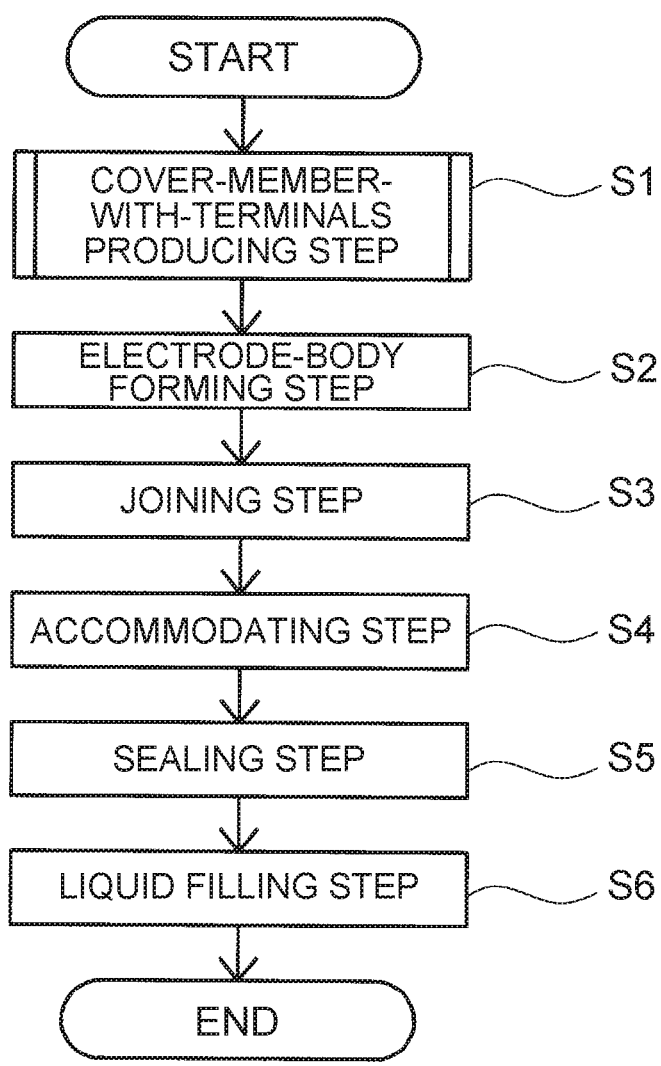
FIG. 10 is a flowchart showing a flow of a manufacturing method for the hermetically sealed battery according to the embodiment.
Figure 11:
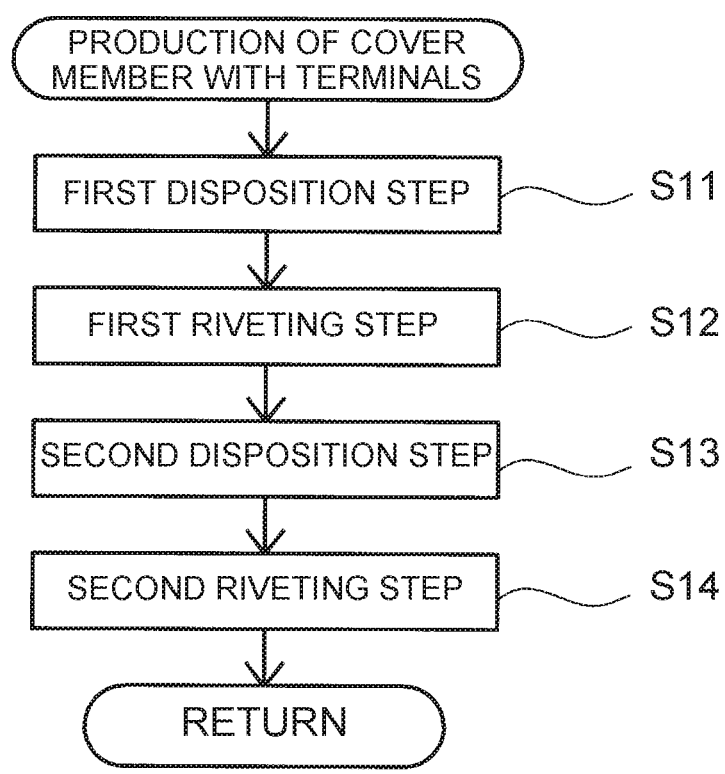
FIG. 11 is a flowchart showing a sub routine of FIG. 10.

The manufacturing method of the battery according to the present embodiment will be described, hereinafter. FIG. 10 is a flowchart showing a flow of the manufacturing method of the hermetically sealed battery according to the embodiment. FIG. 11 is a flowchart showing a sub-routine of FIG. 10.

As shown in FIG. 10, in step S1 (a cover-member-with-terminals producing step), the cover member with terminals 115 is produced. Specifically, the battery case cover 113 in a rectangular platy shape is prepared. At this time, the liquid filling port 113n of the battery case cover 113 is not sealed by the liquid filling plug 113m (the liquid filling plug 113m is not attached yet).

Further, there are prepared the positive-electrode second terminal member 135, the positive-electrode first terminal member 137, and the positive-electrode coupling member 139. There are also prepared the negative-electrode second terminal member 145, the negative-electrode first terminal member 147, and the negative-electrode coupling member 149. Furthermore, there are prepared the two first insulating members 170 and the two second insulating members 180. At this time, the shaft portion 132 of the positive-electrode second terminal member 135 and the shaft portion 142 of the negative-electrode second terminal member 145 are before being riveted and plastically deformed, so that each of them is in a right circular cylindrical shape (the external enlarged-diameter portions 133, 143 are not formed yet, see FIG. 5).

Figure 5:
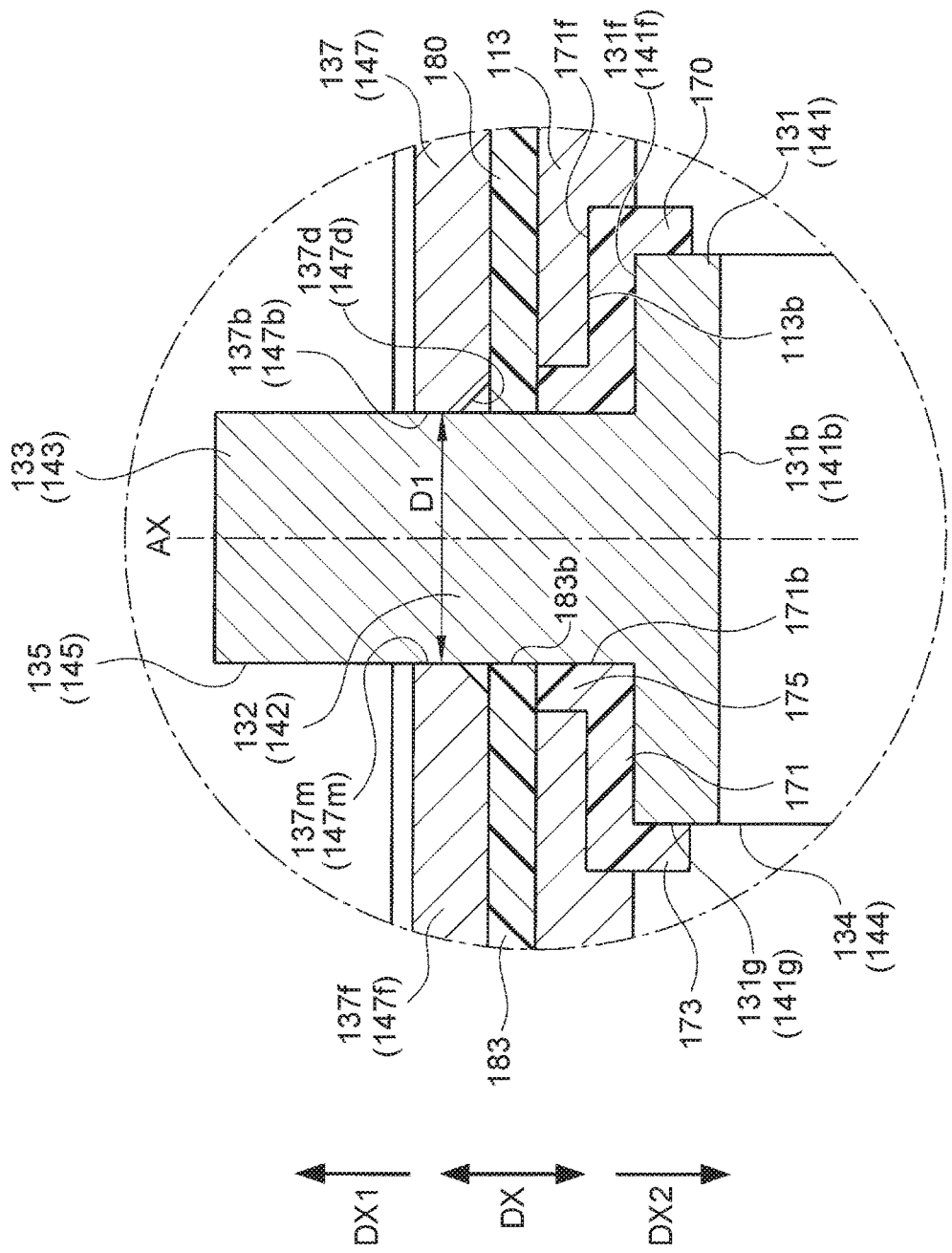
FIG. 5 is a view showing a state immediately before a second terminal member is riveted, at the same position in FIG. 1.
Figure 6:
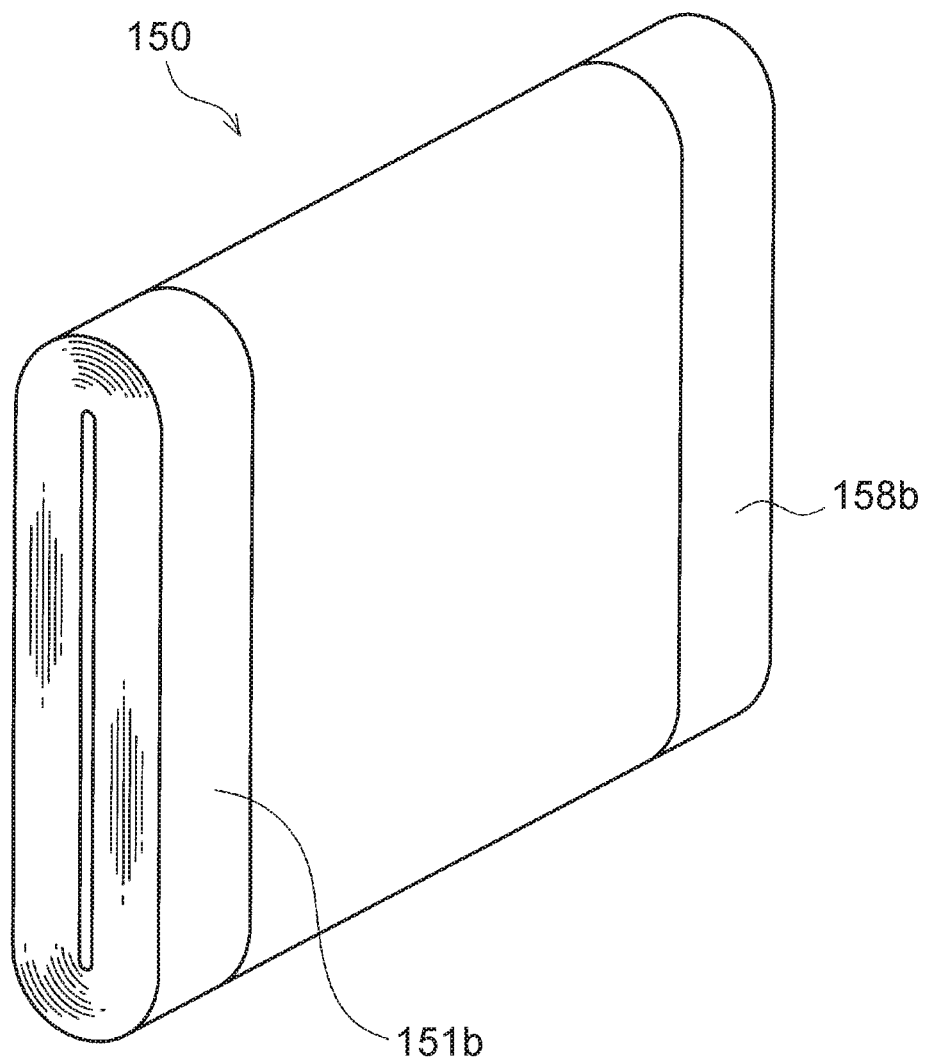
FIG. 6 is a perspective view of an electrode body.

Subsequently, these components are integrally assembled. Specifically, as shown in FIG. 11, first, in step S11 (a first disposition step), the shaft portion 132 (in a circular cylindrical shape at this stage) of the positive-electrode second terminal member 135 is inserted from the front end thereof through the portion 171b defining the through-hole of the first insulating member 170, the portion 113h defining the cover through-hole of the battery case cover 113, the portion 183b defining the through-hole of the second insulating member 180, and the portion 137b defining the terminal through-hole of the positive-electrode first terminal member 137 in this order (see FIG. 4, FIG. 5). Through this, as shown in FIG. 5, the first insulating member 170, the battery case cover 113, and the second insulating member 180 are disposed between the base seat portion 131 of the positive-electrode second terminal member 135 and the positive-electrode first terminal member 137. Note that prior to this step, the head portion 139b of the positive-electrode coupling member 139 is disposed in the head disposition portion 181 of the second insulating member 180, and the shaft portion 139c of the positive-electrode coupling member 139 is inserted through the portion 137c defining the through-hole of the positive-electrode first terminal member 137.

Figure 12:
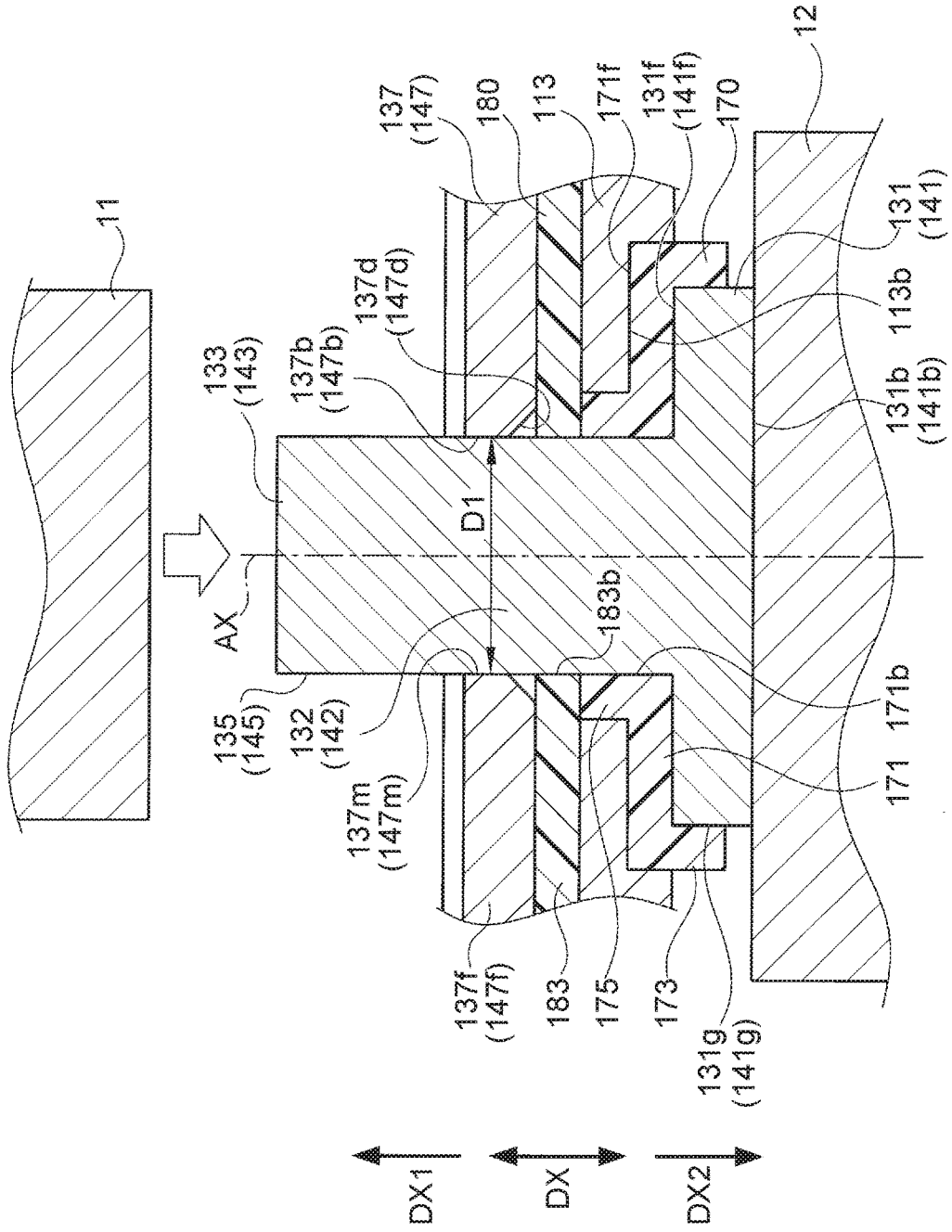
FIG. 12 is a view explaining a riveting step of the embodiment.

Next, proceeding to step S12 (a first riveting step), the shaft portion 132 of the positive-electrode second terminal member 135 is pressed and squeezed by press-riveting toward the axial-direction rear end side DX2 to be plastically deformed. Specifically, as shown in FIG. 12, while a die 12 (lower die) in a rectangular parallelepiped shape is in contact with the lower surface 131b of the base seat portion 131 of the positive-electrode second terminal member 135, a die 11 (upper die) in a rectangular parallelepiped shape is moved from above (from the axial-direction front end side DX1 of) the shaft portion 132 of the positive-electrode second terminal member 135 in a downward direction (toward the axial-direction rear end side DX2) so as to press and squeeze the shaft portion 132 to the axial-direction rear end side DX2 (in the downward direction in FIG. 12) by the die 11.

Through this, as shown in FIG. 2, the region of the shaft portion 132, the region projecting toward the axial-direction front end side DX1 (upward) from the portion 137b defining the terminal through-hole of the positive-electrode first terminal member 137, is pressed and squeezed toward the axial-direction rear end side DX2 so as to be enlarged in diameter (plastically enlarged in diameter) to be larger than that of the portion 137b defining the terminal through-hole, to thereby being deformed (plastically deformed) into the external enlarged-diameter portion 133 in a disk shape. Through this, while the external enlarged-diameter portion 133 is brought to come in contact with the positive-electrode first terminal member 137, and the positive-electrode first terminal member 137, the second insulating member 180, the battery case cover 113, and the first insulating member 170 are held between the base seat portion 131 of the positive-electrode second terminal member 135 and the external enlarged-diameter portion 133, a compressing force is applied in the axial direction DX so as to fix all these components.

In addition, as aforementioned, when the shaft portion 132 is pressed and squeezed toward the axial-direction rear end side DX2, the region of the shaft portion 132, the region being located inward (radially inward) of the tapered surface 137d of the positive-electrode first terminal member 137, is enlarged in diameter (plastically enlarged in diameter) to be formed into the annular projecting portion 132b in contact with the tapered surface 137d. Through this, the hole circumferential portion 137j located around the portion 137b defining the terminal through-hole of the positive-electrode first terminal member 137 is held between the external enlarged-diameter portion 133 and the annular projecting portion 132b, to thereby fix the positive-electrode first terminal member 137 to the positive-electrode second terminal member 135.

In the above manner, by employing the structure to hold the hole circumferential portion 137j of the metallic positive-electrode first terminal member 137 between the external enlarged-diameter portion 133 and the annular projecting portion 132b of the metallic positive-electrode second terminal member 135 so as to thereby fix the positive-electrode first terminal member 137 to the positive-electrode second terminal member 135, it is possible to firmly connect (mechanically connect) the positive-electrode first terminal member 137 to the positive-electrode second terminal member 135 without welding the positive-electrode first terminal member 137 to the positive-electrode second terminal member 135.

Furthermore, as aforementioned, when the shaft portion 132 is pressed and squeezed toward the axial-direction rear end side DX2, the cylindrical-surface inner portion 132m that is the region of the shaft portion 132, the region being located inward (radially inward) of the cylindrical surface 137m of the positive-electrode first terminal member 137, is enlarged in diameter (plastically enlarged). Through this, the pressing-contact portion 132k that presses the cylindrical surface 137m in the radially outward direction and is also in contact with the cylindrical surface 137m is formed.

In this manner, in the shaft portion 132 of the positive-electrode second terminal member 135, by forming the pressing-contact portion 132k that presses the cylindrical surface 137m of the positive-electrode first terminal member 137 in the radially outward direction and is also in contact with the cylindrical surface 137m, it is possible to form the electric conductive path between the positive-electrode first terminal member 137 and the positive-electrode second terminal member 135 via the cylindrical surface 137m of the positive-electrode first terminal member 137 and the pressing-contact portion 132k of the positive-electrode second terminal member 135. In addition, since the cylindrical surface 137m of the positive-electrode first terminal member 137 and the pressing-contact portion 132k of the positive-electrode second terminal member 135 can be in contact with each other with pressure applied thereto in the radial direction, thus reducing the contact resistance therebetween.

Further, in addition to the structure to hold the hole circumferential portion 137j of the positive-electrode first terminal member 137 between the external enlarged-diameter portion 133 and the annular projecting portion 132b of the positive-electrode second terminal member 135, it is configured to press the cylindrical surface 137m of the positive-electrode first terminal member 137 in the radially outward direction by the pressing-contact portion 132k of the positive-electrode second terminal member 135, to thereby more firmly connect (mechanically connect) the positive-electrode first terminal member 137 and the positive-electrode second terminal member 135 to each other.

When the inner diameter (diameter) of the cylindrical surface 137m before step S12 (the first riveting step) is carried out is defined as D1 (see FIG. 5), and the inner diameter (maximum dimension) of the cylindrical surface 137m after step S12 (the first riveting step) is carried out is defined as D2 (see FIG. 2), a relation of D1<D2 is satisfied. As aforementioned, when the shaft portion 132 is pressed and squeezed toward the axial-direction rear end side DX2 to enlarge the cylindrical-surface inner portion 132m of the shaft portion 132 in diameter so as to be formed into the pressing-contact portion 132k, the cylindrical surface 137m is pressed and enlarged in the radially outward direction by this pressing-contact portion 132k.

In other words, in step S12 (the first riveting step) of the present embodiment, at least part of the cylindrical-surface inner portion 132m of the positive-electrode first terminal member 137 is enlarged in diameter (plastically enlarged in diameter), to thereby press the cylindrical surface 137m in the radially outward direction to enlarge the cylindrical surface 137m in diameter, and also to form the pressing-contact portion 132k that presses the cylindrical surface 137m in the radially outward direction and is also in contact with the cylindrical surface 137m. That is, at least part of the cylindrical-surface inner portion 132m of the positive-electrode first terminal member 137 is enlarged in diameter (plastically enlarged in diameter) to form the pressing-contact portion 132k that presses the cylindrical surface 137m in the radially outward direction and enlarges the cylindrical surface 137m in diameter, the pressing-contact portion 132k pressing the cylindrical surface 137m in the radially outward direction and also in contact with the cylindrical surface 137m.

In this manner, the pressing-contact portion 132k, which is formed by enlarging in diameter (plastically enlarging in diameter) at least a part of the cylindrical-surface inner portion 132m until the cylindrical surface 137m is enlarged in diameter, comes into contact with (connect to) the cylindrical surface 137m with a great pressure (in a firm manner). Accordingly, it is possible to reduce the contact resistance between the cylindrical surface 137m of the positive-electrode first terminal member 137 and the pressing-contact portion 132k of the positive-electrode second terminal member 135 to be further smaller, and also possible to more firmly connect (mechanically connect) the positive-electrode first terminal member 137 to the positive-electrode second terminal member 135.

By carrying out step S12 (the first riveting step), the first interposed portion 171 of the first insulating member 170 is held between the base seat portion 131 and the external enlarged-diameter portion 133 to come into a state of being elastically compressed in the axial direction DX. Through this, it is possible to properly seal a part between the base seat portion 131 and the battery case cover 113. In addition, the second interposed portion 183 of the second insulating member 180 is held between the base seat portion 131 and the external enlarged-diameter portion 133 to come into a state of being elastically compressed in the axial direction DX. Through this, it is possible to properly seal a part between the positive-electrode first terminal member 137 and the battery case cover 113.

Next, in step S13 (a second disposition step), the shaft portion 142 (in a right circular cylindrical shape at this stage) of the negative-electrode second terminal member 145 is inserted from the front end thereof through the portion 171b defining the through-hole of the first insulating member 170, the portion 113k defining the cover through-hole of the battery case cover 113, the portion 183b defining the through-hole of the second insulating member 180, and the portion 147b defining the terminal through-hole of the negative-electrode first terminal member 147 in this order (see FIG. 4, FIG. 5). Through this, as shown in FIG. 5, the first insulating member 170, the battery case cover 113, and the second insulating member 180 are disposed between the base seat portion 141 of the negative-electrode second terminal member 145 and the negative-electrode first terminal member 147. Prior to this step, the head portion 149b of the negative-electrode coupling member 149 is disposed in the head disposition portion 181 of the second insulating member 180, and the shaft portion 149c of the negative-electrode coupling member 149 is inserted through the portion 147c defining the through-hole of the negative-electrode first terminal member 147.

Subsequently, proceeding to step S14 (a second riveting step), as with step S12 (the first riveting step), the shaft portion 142 of the negative-electrode second terminal member 145 is pressed and squeezed by the press-riveting toward the axial-direction rear end side DX2 so as to be plastically deformed (see FIG. 12). Through this, while the external enlarged-diameter portion 143 is in contact with the negative-electrode first terminal member 147, and the negative-electrode first terminal member 147, the second insulating member 180, the battery case cover 113, and the first insulating member 170 are held between the base seat portion 141 and the external enlarged-diameter portion 143 of the negative-electrode second terminal member 145 with a compressing force applied thereto in the axial direction DX, these components are fixed (see FIG. 2). Also in this step S14 (the second riveting step), the same operational effect as that in the aforementioned step S12 (the first riveting step) is exerted.

By carrying out each processing of steps S11 to S14 in the above manner, the battery case cover 113, the positive-electrode terminal member 130 (the positive-electrode first terminal member 137, the positive-electrode second terminal member 135, the positive-electrode coupling member 139), the negative-electrode terminal member 140 (the negative-electrode first terminal member 147, the negative-electrode second terminal member 145, the negative-electrode coupling member 149), the first insulating members 170, 170, and the second insulating members 180, 180 are integrated into the cover member with terminals 115 (see FIG. 4).

Next, proceeding to step S2 (an electrode-body forming step), the electrode body 150 is formed. Specifically, the positive-electrode composite layer 152 containing the positive-electrode active material 153 is formed on the surface of the positive-electrode base member 151 made of a belt-shaped aluminum foil so as to obtain the positive electrode plate 155 (see FIG. 7). The negative-electrode composite layer 159 containing the negative-electrode active material 154 is formed on the surface of the negative-electrode base member 158 made of a belt-shaped copper foil so as to obtain the negative electrode plate 156 (see FIG. 8).

Figure 9:
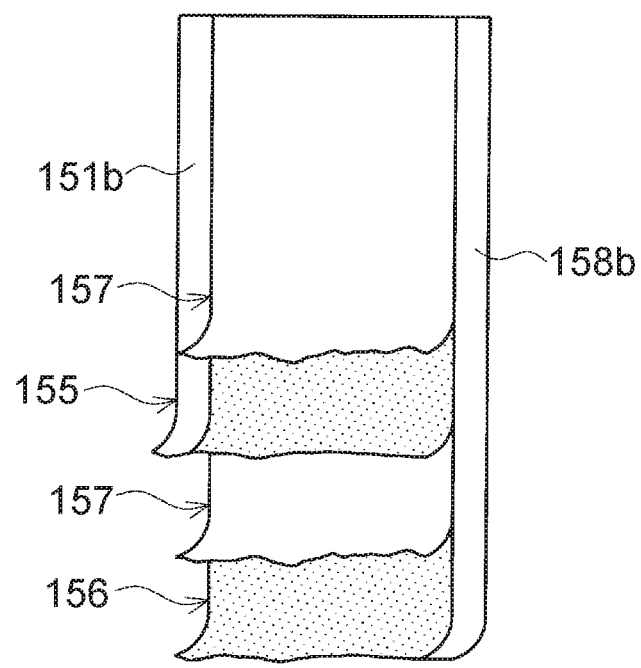
FIG. 9 is a view explaining a step of forming the same electrode body.

Subsequently, the negative electrode plate 156, the separator 157, the positive electrode plate 155, and the separator 157 are overlaid in this order, and are then wound (see FIG. 9). Specifically, the positive-electrode-composite non-applied portion 151b of the positive electrode plate 155 and the negative-electrode-composite non-applied portion 158b of the negative electrode plate 156 are arranged to be opposite to each other in the width direction (the lateral direction in FIG. 9), and the negative electrode plate 156, the separator 157, the positive electrode plate 155, and the separator 157 are wound into a flat shape to be formed into the electrode body 150 (see FIG. 6).

Next, proceeding to step S3 (a joining step), the electrode-body connecting portion 134 of the positive-electrode second terminal member 135 is joined to the positive-electrode-composite non-applied portion 151b of the electrode body 150. In addition, the electrode-body connecting portion 144 of the negative-electrode second terminal member 145 is joined (welded) to the negative-electrode-composite non-applied portion 158b of the electrode body 150. Through this, the positive-electrode terminal member 130 is electrically connected to the positive electrode plate 155, the negative-electrode terminal member 140 is electrically connected to the negative electrode plate 156, and the cover member with terminals 115 is integrated with the electrode body 150.

Subsequently, proceeding to step S4 (an accommodating step), the electrode body 150 is accommodated in the battery case body 111, and the opening 111d of the battery case body 111 is closed by the battery case cover 113. In this state, proceeding to step S5 (a sealing step), the battery case cover 113 and the battery case body 111 are joined to each other through a full-circled welding.

Thereafter, proceeding to step S6 (a liquid filling step), an electrolytic solution (not shown) is filled into the battery case body 111 via the liquid filling port 113n of the battery case cover 113 so that the inside of the electrode body 150 is impregnated with this electrolytic solution. Subsequently, the liquid filling port 113n of the battery case cover 113 is sealed by the liquid filling plug 113m. Thereafter, a predetermined processing is carried out so as to complete the hermetically sealed battery 100 of the present embodiment (see FIG. 1).

In the above description, the present disclosure has been explained in accordance with the embodiment but it is needless to mention that the present disclosure is not limited to the aforementioned embodiment, and may be appropriately modified without departing from the scope of the disclosure.

For example, in the embodiment, it is exemplified that the terminal member located on the battery case cover 113 (outside the battery case 110) is the first terminal member (the positive-electrode first terminal member 137 and the negative-electrode first terminal member 147), and the terminal member connected (joined) to the electrode body 150 inside the battery case 110 is the second terminal member (the positive-electrode second terminal member 135 and the negative-electrode second terminal member 145). However, the present disclosure may also be applied to the case having a reverse configuration thereto.

Specifically, the terminal member located on the battery case cover 113 (outside the battery case 110) may be the second terminal member, and the terminal member connected (joined) to the electrode body 150 inside the battery case 110 may be the first terminal member. In this case, the base seat portion of the second terminal member is disposed outside the battery case 110 (for example, the fixed portions 137f, 147f of the embodiment are changed to the base seat portion), and the shaft portion is formed in a shape extending downward from this base seat portion into the battery case 110 via the portion defining the cover through-hole, and the external enlarged-diameter portion is disposed in the battery case 110.

What is claimed is:

1. A manufacturing method for a hermetically sealed battery, the hermetically sealed battery including:
a battery case body in a box-shape having an opening;
an electrode body accommodated in the battery case body;
a battery case cover having a portion defining a cover through-hole, the battery case cover covering the opening of the battery case body;
a metallic first terminal member having a portion defining a terminal through-hole; and
a metallic second terminal member that includes a solid cylindrical shaft portion inserted through the portion defining the cover through-hole and the portion defining the terminal through-hole, and a base seat portion located on rear end side of the shaft portion,
the manufacturing method for the hermetically sealed battery comprising:
inserting the shaft portion of the second terminal member from front end side of the shaft portion through the portion defining the cover through-hole of the battery case cover and the portion defining the terminal through-hole of the first terminal member in this order so as to dispose the battery case cover between the base seat portion of the second terminal member and the first terminal member; and
pressing and squeezing the shaft portion of the second terminal member toward the rear end side of the shaft portion so as to plastically deform the shaft portion; wherein
when the riveting is carried out,
a region of the shaft portion is pressed and squeezed toward the rear end side, the region of the shaft portion projecting from the portion defining the terminal through-hole of the first terminal member toward the front end side, the region of the shaft portion being located outside the portion defining the terminal through-hole such that a diameter of the region of the shaft portion becomes larger than a diameter of the portion defining the terminal through-hole,
the region of the shaft portion is deformed into an external enlarged-diameter portion in a disk shape such that the external enlarged-diameter portion comes into contact with the first terminal member and the battery case cover and the first terminal member are held and fixed between the base seat portion and the external enlarged-diameter portion,
a region of a hole-inner circumferential surface composing the portion defining the terminal through-hole of the first terminal member, the region of the hole-inner circumferential surface being located on a battery case cover side, includes a tapered surface gradually enlarged in diameter as the tapered surface extends toward the battery case cover side and opening toward the battery case cover side,
when the riveting is carried out, the region of the shaft portion of the second terminal member, the region of the shaft portion being located inward of the tapered surface, is enlarged in diameter so as to form an annular projecting portion in contact with the tapered surface, and
a hole circumferential portion located around the portion defining the terminal through-hole of the first terminal member is held between the external enlarged-diameter portion and the annular projecting portions so as to fix the first terminal member to the second terminal member.

2. The manufacturing method for the hermetically sealed battery according to claim 1, wherein
the hole-inner circumferential surface composing the portion defining the terminal through-hole of the first terminal member includes a cylindrical surface in a circular cylindrical shape opening toward an external enlarged-diameter portion side and the tapered surface, and
when the riveting is carried out,
at least part of a cylindrical-surface inner portion that is the region of the shaft portion of the second terminal member, the region of the shaft portion being located inward of the cylindrical surface, is enlarged in diameter so as to form a pressing-contact portion that presses the cylindrical surface toward a radially outward direction and in contact with the cylindrical surface.

3. The manufacturing method for the hermetically sealed battery according to claim 1, wherein
when disposition is carried out,
a first insulating member is interposed between the base seat portion of the second terminal member and the battery case cover, a second insulating member is interposed between the first terminal members and the battery case cover,
the first insulating member, the battery case cover, and the second insulating member are disposed between the base seat portion and the first terminal member, and
when the riveting is carried out,
in a state in which a region of the first insulating member and the second insulating member, the region of the first insulating member and the second insulating member being held between the base seat portion and the external enlarged-diameter portion of the second terminal member, is elastically compressed,
the first insulating member, the battery case cover, the second insulating member, and the first terminal member are held and fixed between the base seat portion and the external enlarged-diameter portion.

4. A hermetically sealed battery comprising:
a battery case body in a box-shape having an opening;
an electrode body accommodated in the battery case body;
a battery case cover having a portion defining a cover through-hole, the battery case cover covering the opening of the battery case body;
a metallic first terminal member having a portion defining a terminal through-hole; and
a metallic second terminal member that includes a solid cylindrical shaft portion inserted through the portion defining the cover through-hole and the portion defining the terminal through-hole, and a base seat portion located on rear end side of the shaft portion,
the battery case cover being disposed between the base seat portion of the second terminal member and the first terminal member,
wherein
the shaft portion of the second terminal member includes:
a terminal-through-hole inner portion disposed inside the portion defining the terminal through-hole of the first terminal member; and a disk-shaped external enlarged-diameter portion that is a region located on a front end side of the shaft portion, the region located on the front end side of the shaft portion being located outside the portion defining the terminal through-hole of the first terminal member and having greater diameter than a diameter of the portion defining the terminal through-hole, the external enlarged-diameter portion is in contact with the first terminal member, the battery case cover and the first terminal member are held and fixed between the base seat portion and the external enlarged-diameter portion, a region of a hole-inner circumferential surface composing the portion defining the terminal through-hole of the first terminal member, the region of the hole-inner circumferential surface being located on a battery case cover side, includes a tapered surface gradually enlarged in diameter as the tapered surface extends toward the battery case cover side and opening toward the battery case cover side, a region of the shaft portion of the second terminal member, the region of the shaft portion being located inward of the tapered surface, includes an annular projecting portion in a form that projects radially outward of the shaft portion to be in contact with the tapered surface, and a hole circumferential portion located around the portion defining the terminal through-hole of the first terminal member is held between the external enlarged-diameter portion and the annular projecting portion so as to fix the first terminal member to the second terminal member.

5. The hermetically sealed battery according to claim 4, wherein the hole-inner circumferential surface composing the portion defining the terminal through-hole of the first terminal member includes cylindrical surface in a circular cylindrical shape opening toward an external enlarged-diameter portion side and the tapered surface, and a cylindrical-surface inner portion that is the region of the shaft portion of the second terminal member, the region of the shaft portion being located inward of the cylindrical surface, includes a pressing-contact portion that presses the cylindrical surface toward a radially outward direction and in contact with the cylindrical surface.

6. The hermetically sealed battery according to claim 4, further comprising:

a first insulating member interposed between the base seat portion of the second terminal member and the battery case cover; and a second insulating member interposed between the first terminal member and the battery case cover, wherein in a state in which a region of the first insulating member and the second insulating member, the region of the first insulating member and the second insulating member being held between the base seat portion and the external enlarged-diameter portion of the second terminal member, is elastically compressed, the first insulating member, the battery case cover, the second insulating member, and the first terminal member are held and fixed between the base seat portion and the external enlarged-diameter portion.

* * * * *